US 8,233,530 B2

(12) United States Patent
Amsterdam et al.

(10) Patent No.: US 8,233,530 B2
(45) Date of Patent: Jul. 31, 2012

(54) VIDEO SCENE MATCHING ON RETURN FROM VIRTUAL RENDERING IN A CONSUMER DIGITAL VIDEO RECORDING DEVICE

(75) Inventors: Jeffrey D. Amsterdam, Marietta, GA (US); Gregory J. Boss, American Fork, UT (US); Rick A. Hamilton, II, Charlottesville, VA (US); Kulvir S. Bhogal, Pflugerville, TX (US); Brian M. O'Connell, Cary, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 716 days.

(21) Appl. No.: 12/259,856

(22) Filed: Oct. 28, 2008

(65) Prior Publication Data

US 2010/0104005 A1    Apr. 29, 2010

(51) Int. Cl.
*H04N 5/77* (2006.01)
(52) U.S. Cl. .............. 375/240.01; 345/632; 386/223
(58) Field of Classification Search ............. 375/240.01; 345/632; 386/223
See application file for complete search history.

(56) References Cited

U.S. PATENT DOCUMENTS

| | | | |
|---|---|---|---|
| 5,585,866 A | 12/1996 | Miller et al. | |
| 5,745,126 A | 4/1998 | Jain et al. | |
| 5,808,662 A | 9/1998 | Kinney et al. | |
| 6,038,368 A | 3/2000 | Boetje et al. | |
| 6,177,931 B1 | 1/2001 | Alexander et al. | |
| 6,822,693 B2 | 11/2004 | Bates et al. | |
| 7,113,773 B2 | 9/2006 | Quick, Jr. et al. | |
| 7,114,172 B2 | 9/2006 | Lord | |
| 7,142,209 B2 | 11/2006 | Uyttendaele et al. | |
| 7,173,672 B2 * | 2/2007 | Gibbs et al. | 348/589 |
| 7,246,367 B2 | 7/2007 | Livonen | |
| 7,324,594 B2 * | 1/2008 | Lamboray et al. | 375/240.03 |
| 7,669,219 B2 | 2/2010 | Scott, III | |
| 7,868,904 B2 * | 1/2011 | Morita et al. | 345/633 |
| 2002/0188943 A1 | 12/2002 | Freeman et al. | |
| 2003/0016673 A1 | 1/2003 | Pendakur et al. | |
| 2003/0056220 A1 | 3/2003 | Thornton et al. | |
| 2003/0086694 A1 | 5/2003 | Davidsson | |
| 2003/0099462 A1 | 5/2003 | Matsugami | |
| 2003/0156827 A1 | 8/2003 | Janevski | |
| 2003/0219228 A1 | 11/2003 | Thiagarajan et al. | |
| 2004/0151474 A1 | 8/2004 | Suh | |
| 2005/0005308 A1 | 1/2005 | Logan | |
| 2005/0172315 A1 | 8/2005 | Chen | |
| 2005/0246749 A1 | 11/2005 | Tsuruga et al. | |

(Continued)

*Primary Examiner* — Matthew Smithers
(74) *Attorney, Agent, or Firm* — Mitch Harris, Atty at Law, LLC; Andrew M. Harris; Mark C. Vallone

(57) ABSTRACT

A method, system and computer program provide a mechanism for smoothing the transition back from a virtual (computer generated) scene to a related video stream. An event such as a user input or timeout is received triggering a return to display of the video stream from a virtual scene related to content of the video stream. A number of time points and/or camera angles are either presented to the user or are automatically searched for the best match. The list may be presented in order according to an automatically detected matching criteria. The virtual scene may a scene constructed locally within a computer or digital video recorder (DVR) and the matching performed locally based on angle and time information provided from a content provider such as a server, or the virtual scene generation and matching may be performed at a remote location such as the content server.

20 Claims, 6 Drawing Sheets

U.S. PATENT DOCUMENTS

| | | |
|---|---|---|
| 2006/0026646 A1 | 2/2006 | Lou et al. |
| 2006/0052067 A1 | 3/2006 | Singh et al. |
| 2006/0062147 A1 | 3/2006 | Dougall et al. |
| 2006/0132482 A1* | 6/2006 | Oh .................................. 345/419 |
| 2006/0174293 A1 | 8/2006 | Ducheneaut |
| 2006/0288361 A1 | 12/2006 | White Eagle et al. |
| 2007/0189708 A1 | 8/2007 | Lerman et al. |
| 2007/0283403 A1 | 12/2007 | Eklund et al. |
| 2008/0010518 A1 | 1/2008 | Jiang et al. |
| 2008/0024523 A1* | 1/2008 | Tomite et al. .................. 345/632 |
| 2008/0086743 A1 | 4/2008 | Cheng et al. |
| 2008/0189380 A1 | 8/2008 | Bosworth |
| 2008/0313402 A1 | 12/2008 | Wong et al. |
| 2009/0044216 A1 | 2/2009 | McNicoll |
| 2009/0074380 A1 | 3/2009 | Boston et al. |
| 2009/0199013 A1 | 8/2009 | Raciborski et al. |
| 2009/0220216 A1 | 9/2009 | Marsh et al. |
| 2009/0263101 A1 | 10/2009 | Rudolph et al. |
| 2010/0107104 A1 | 4/2010 | Bruce et al. |
| 2011/0030012 A1 | 2/2011 | Diaz Perez |

* cited by examiner

VIDEO SCENE MATCHING ON RETURN FROM VIRTUAL RENDERING IN A CONSUMER DIGITAL VIDEO RECORDING DEVICE

BACKGROUND OF THE INVENTION

1. Field of the Invention

The present invention is related to consumer digital video recording devices (DVRs), and more particularly to a method and DVR that match a video stream with an exit point from a virtual scene.

2. Description of Related Art

Digital video recorder (DVRs), which may be in the form of a portable device such as a personal video recorder (PVR), a set-top box or a computer having a video interface and/or video capability provided from a digital or analog network source are becoming ubiquitous in households and other locations.

Techniques such as those disclosed in U.S. Pat. No. 7,142,209 to *Uyttendaele*, et al., provide the possibility of merging virtual scene technology and video to give the user control of their own perspective, e.g., a "personal" camera angle, when viewing a video program. Other techniques, such as those disclosed in published U.S. Patent Application 2002/0188943 to *Freeman*, et al., provide for "seamless", i.e., video-synchronized switching between different real video views or graphics overlays, as well as other program sources, in response to a user selection.

However, for a user to truly have an integrated seamless experience, the video must not only be synchronized, but changes in camera angle, program position and other features of the displayed video should be minimized at transitions between video sources and/or virtual scenes. In particular, the transition back from a virtual scene to a video stream, which may be one of many video streams, is a complex problem in that a video stream (or a video stream selected from multiple streams) may be at an arbitrary camera angle and event time, while the content of the virtual scene is generally under user control.

Therefore, it would be desirable to provide a method and system that can minimize the transition changes from a virtual scene to a video stream, in order to provide a more seamless viewing experience for program viewers.

BRIEF SUMMARY OF THE INVENTION

The invention is embodied in a method, a digital video recording device (DVR), and a computer program product. The digital video recording device may be a personal video recorder (PVR), set-top box, personal computer, or any other device that provides for selection between a video stream and a virtual scene.

An event is received indicating a request to change from a currently-displayed virtual scene back to a video stream that was previously displayed. The time of switching to the virtual scene is stored and upon reception of the event is retrieved and used to filter possible selections of entry points and/or video sources for the transition from the virtual scene to a selected video stream. The selected video stream may be selected from multiple video sources according to a camera angle at an endpoint of the virtual scene, or if only a single video stream is available, the time of entry into the video stream may be selected by matching the camera angle as closely as possible to the virtual scene endpoint.

The camera angles of the video stream(s) may be provided along with the video stream(s) as sideband information, either encoded along with the video stream, or provided through another channel or network. Alternatively, still images can be extracted from the video stream and pattern matched to discover the camera angles. Selection of the video stream and entry time may be made under user selection, e.g., by providing a list, which may be ordered from "best match" downward, or the transition may be made automatically, directing playback to the "best match" video stream and entry point.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to systems and devices that alternate between virtual scenes (e.g., computer rendered scenes) and video streams (e.g., video camera footage). In order to provide a more seamless viewing experience, upon return from displaying a virtual scene related to video stream content, a video stream and/or time point is found that closely matches the camera angle and/or content at the endpoint of the virtual scene. A single video stream may be searched by matching extracted still images or by using other scene-matching techniques in order to locate a time point for exit from the virtual scene that will provide a substantially seamless transition back to the video stream. The time point is constrained to a time after a previous exit from the video stream by checking against a time stamp of a stored exit point from the video stream. If multiple video streams are available, e.g., video streams from different cameras having different camera angles, then the video stream most closely matching the perspective of the endpoint of the virtual scene will be presented. The selection may be made automatically, according to a "best match" criterion, or a list may be presented to a viewer for selection from multiple video sources and/or time points. Camera angle information may be provided in conjunction with the video stream information, e.g., from a separate channel such as an Internet feed, or encoded along with the video stream information in a broadcast, satellite or closed-circuit distribution source.

Figure 1:
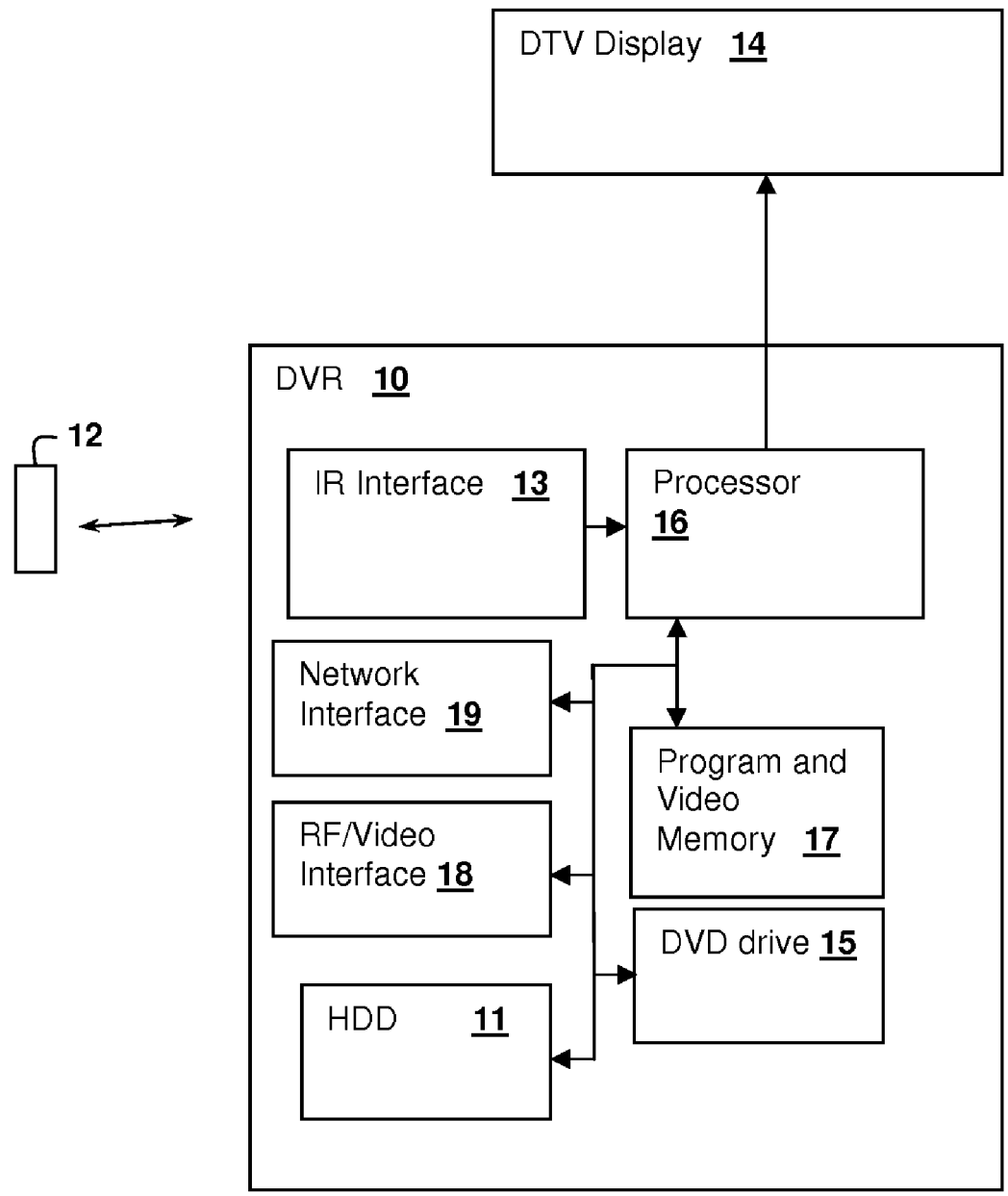
FIG. 1 is a block diagram illustrating a digital video recorder (DVR) in accordance with an embodiment of the present invention.

Referring now to FIG. 1, a digital video recorder (DVR) 10, in accordance with an embodiment of the invention, is shown. DVR 10 is connected to an external digital television (DTV) display 14, but DVR 10 may alternatively be a portable device having an integral display. A remote control 12 is used to control operation of DVR 10, in the exemplary embodiment according to methods of the present invention, in order to provide user input. However, it is understood that other user input methodologies can be employed, such as buttons and other controls integral to DVR 10. DVR 10 includes an infrared (IR) interface 13 for receiving commands from remote control 12, a processor 16 for executing program instructions that process video and virtual scene information in accordance with methodologies described in further detail below, and also provides control and other functionality as generally associated with DVR operations. A program and video memory 17 is coupled to processor 16 for storing data and program instructions, including program instructions in accordance with a computer program product embodiment of the present invention. A radio-frequency (RF)/video interface 18 receives video signals or RF signals from broadcast, closed-circuit or other video streaming sources and provides them for selection by processor 16 for ultimate display by DTV display 14. A network interface 19 provides wired or wireless connection to public or private networks such as the Internet, for receiving additional information such as sideband camera angle and other information associated with video streams received by RF/Video interface 18. Alternatively, network interface 19 may constitute the entire interface for receiving both the video streams (e.g., MPEG streams) and optional additional sideband information. A digital versatile disc (DVD) drive 15 and hard disk drive (HDD) 11 are also included in DVR 10 both for recording video program and other information. In another alternative embodiment of the present invention, program information stored on a disc inserted into DVD drive 15 or on hard disc drive (HDD) 11 may be manipulated by a viewer to switch to a virtual scene display, and the techniques of the present invention may be used to select time points and/or a video stream (e.g., a video stream selected from a number of differing-camera-angle video streams provided on DVD media) for return to display of a video stream. In some embodiments, components such as DVD drive 15, HDD 11, and IR interface 13 may not be present, may be located in other devices, or may be replaced with other technologies, such as solid-state drives (SSD), Blu-ray Disc (BD) drives, Bluetooth interfaces, RF interfaces, WiFi interfaces, and the like.

Figure 2:
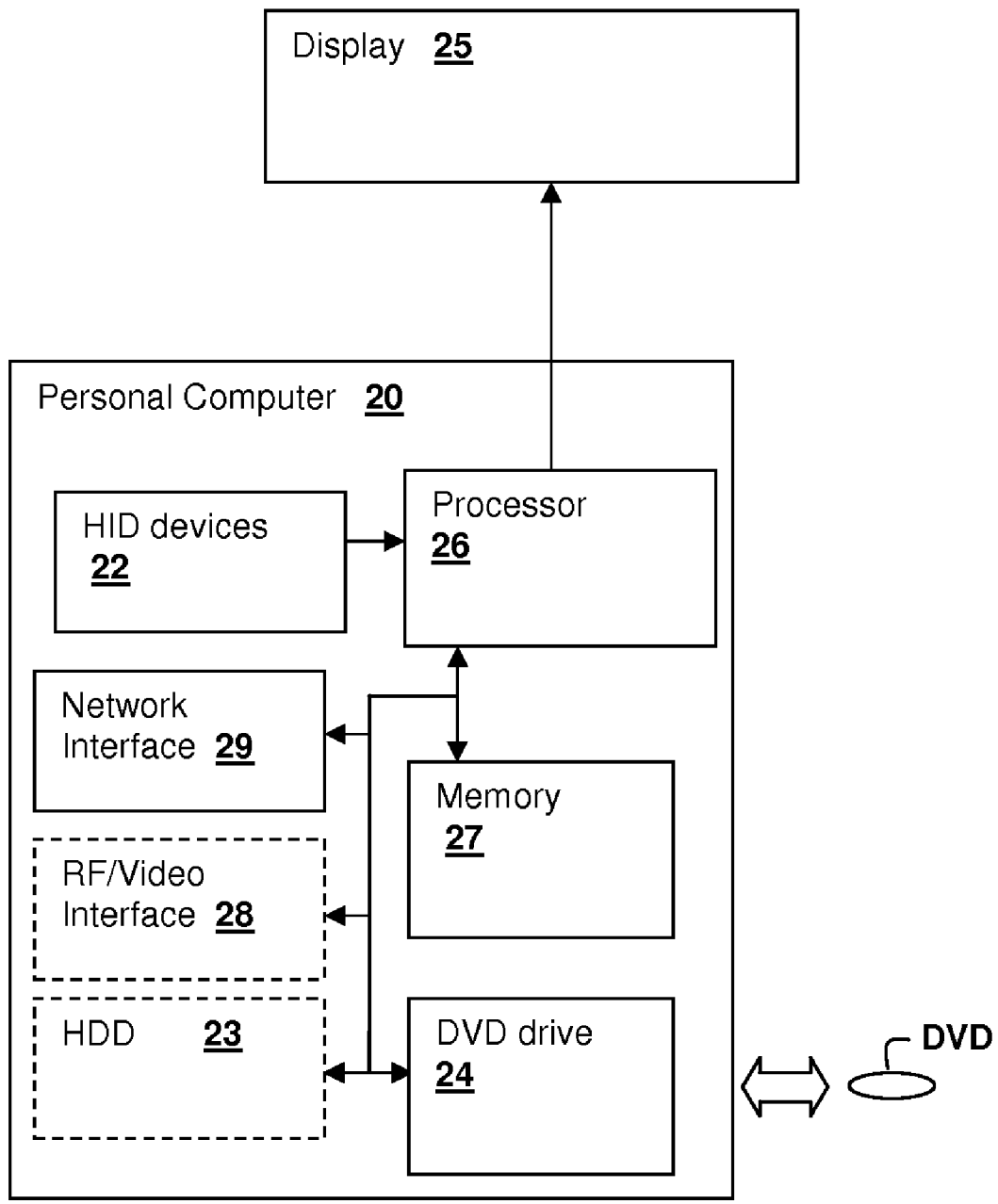
FIG. 2 is a block diagram illustrating a digital video recorder (DVR) in accordance with another embodiment of the present invention.

Referring now to FIG. 2, a DVR 20 in accordance with another embodiment of the invention is illustrated, in the form of a personal computer system. DVR 20 is implemented by personal computer 20, which includes a processor 26 coupled to a memory 27 for storing program instructions including program instructions for implementing a DVR, for example by executing a third-party DVR program. Memory 27 further includes program instructions for carrying out techniques in accordance with the present invention, which may be integrated in such a DVR program, or may be provided as a stand-alone application or plug-in that enhances functionality of the DVR program or operating system. The program may be loaded into memory 27 or HDD 23 from a DVD drive 24 from a data storage media forming a computer program product in accordance with an embodiment of the present invention, such as DVD disc DVD. In order to receive video information from closed-circuit or broadcast sources, personal computer 20 includes an RF/Video interface 28. However, techniques in accordance with an embodiment of the present invention can be performed on video received from a network interface 29 and RF/Video interface 28 is not required in such embodiments. Also, as mentioned above with respect to DVR 10 of FIG. 1, personal computer 20 may receive sideband information such as camera angle data from network interface 29, or RF/Video interface 28 in addition to, and in conjunction with, video information. Personal computer 20 also includes a human interface device (HID) interface 22 for connection of HIDs, such as keyboards and pointing devices. Personal computer 20 is also illustrated as connected to an external display 25. However, if personal computer 20 is a laptop, tablet or other integrated device, display 25 will generally be integral to personal computer 20. In some embodiments, some of the components shown in FIG. 2 may be absent, located within another device, or may be substituted with other technologies.

Figure 3:
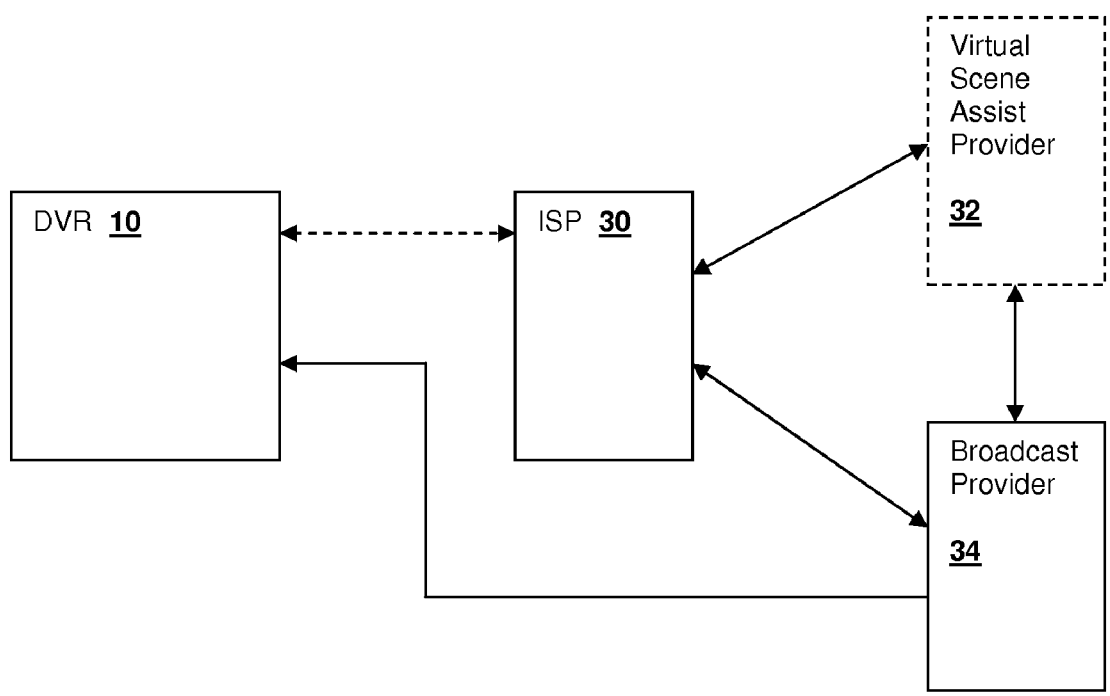
FIG. 3 is a block diagram illustrating a system in accordance with an embodiment of the present invention.

Referring now to FIG. 3, a networked system in accordance with an embodiment of the present invention is shown. A DVR, such as DVR 10, as illustrated in FIG. 1, receives signals from one or more broadcast providers 34, through one or more channels as mentioned above, e.g., RF broadcast, satellite broadcast and/or closed-circuit cable. DVR 10 may also receive video information from a generic network data source, such as an Internet Service Provider (ISP) 30 or other network provider, which may also be the channel that provides video data from broadcast provider 34, obviating any need for an RF/Video connection. The above-described sideband information that informs camera angles and other data for informing return from a virtual scene can be provided from broadcast provider 34 via ISP 30 or encoded along with video/RF information received directly from broadcast provider 34. Finally, a virtual scene assist provider 32 may be located remotely from DVR 10 and may either generate video corresponding to the virtual scene remotely according to user-provided control information received from DVR 10 through ISP 30 or may provide other information needed for constructing the virtual scene within DVR 10. For example, a three-dimensional vector representation of a virtual scene associated with broadcast video provided by broadcast provider 34 may be provided, e.g., by a file transfer request, a database query, an RSS feed or other data retrieval technique to DVR 10, and DVR 10 then generates the virtual scene according to a position and camera angle specified by user control. The depicted system is only exemplary and is intended to illustrate various locations for performing virtual scene construction and various means for sending video and virtual scene information to DVR 10 for viewing of video and virtual scenes, and the control of virtual scenes by an end-user. However, it is understood that other techniques and system configurations may be applied in accordance with other embodiments of the present invention and the particular system configuration should not be construed as limiting the possible system configurations, data sources and end-user appliances that implement techniques in accordance with the present invention as described in further detail below.

Figure 4:
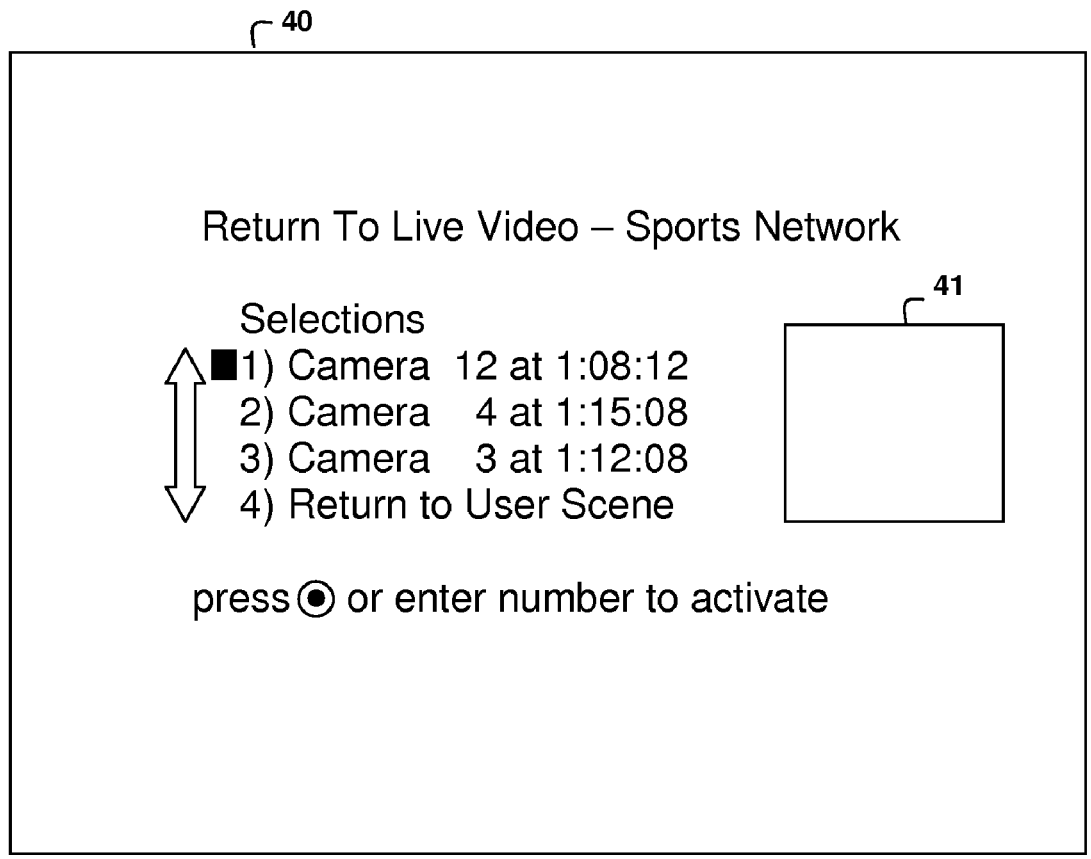
FIG. 4 is a pictorial diagram of a user interface in accordance with an embodiment of the present invention.

Referring now to FIG. 4, a user interface in accordance with an embodiment of the present invention is illustrated, showing a screen that may be presented to a user of DVR 10 or personal computer 20, or other suitable device, when a transition back from a virtual scene to related video is requested and when automatic selection of the "best match" video source is not enabled in systems that provide for automatic selection, or is not implemented in systems that do not. As shown, user interface screen display 40 provides a user with options according to multiple video sources associated with multiple cameras, and specifying a position (specified as a time point) within each video stream for return to the particular video stream. Although not a requirement of the present invention, the selection options are presented in order from a "best match" downward to either the number of matches meeting a match criterion, or a limit of number of options/matches to present/locate. For static cameras, the time points may be omitted, as return to video can be performed at the exit time from the virtual scene. Also, for single-stream video sources, which may be single-camera or switched between multiple cameras, the selection options may specify only time points, as there are no multiple streams to select between. One or more screenshots 41 extracted from the video at the selectable camera angle(s) and time(s) may be displayed, either in icon form, or presented as a single frame in response to a user scrolling through options, to help a user decide which stream and/or time point to select.

Figure 5A:
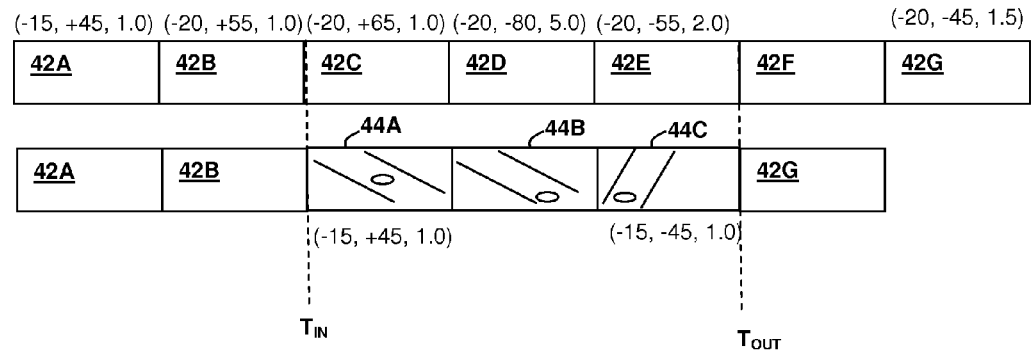
FIGS. 5A and 5B are video timeline diagrams illustrating techniques in accordance with embodiments of the present invention.

Referring now to FIG. 5A, a time line diagram showing a single video source, with segments 42A-42G (which may be frames or longer video elements), and above each element, a set of coordinates according to: (tilt, pan, zoom). Below the video source timeline, an output timeline is shown, in which a user/viewer views video source segments 42A and 42B, and then switches to a virtual scene having segments 44A-44C. As illustrated, the coordinates initially associated with virtual scene segment 44A are matched to video segment 42B. However at segment 44C, the user has changed perspective, for example, in order to view a ball moving toward the edge of the screen. When the user/viewer selects return to video at exit time $T_{OUT}$, a video segment 42G having coordinates (−20, −45, 1.5) closely matching the coordinates (−15, −45, 1.0) of the endpoint of the virtual scene is chosen, either by the user from a list such as the list depicted in FIG. 4 and described above, or automatically according to a "best match" criteria. The coordinates shown in FIG. 5A for the virtual scene are generally "known" by the virtual scene renderer, but the coordinates for video segments 42A-42G are either encoded in the broadcast signal, transmitted by another channel, such as an Internet feed, or are determined by a matching/feature extraction algorithm that examines video segments 42C-42G. Video segments 42A-42B, need not be examined, as they occur before the time of entry to the virtual scene $T_{IN}$. Alternatively, camera angles need not be considered at all, and frame matching techniques can be used instead to determine a best match. For example, still images may be sampled out of video segments 42C-42G and compared by feature size and angle extraction to size and angle information already known for virtual scene segment 44C. Or, frame matching can be performed on video frames sampled out of video segments 42C-42G and compared directly to the endpoint frame(s) of virtual scene segment 44C.

Figure 5B:
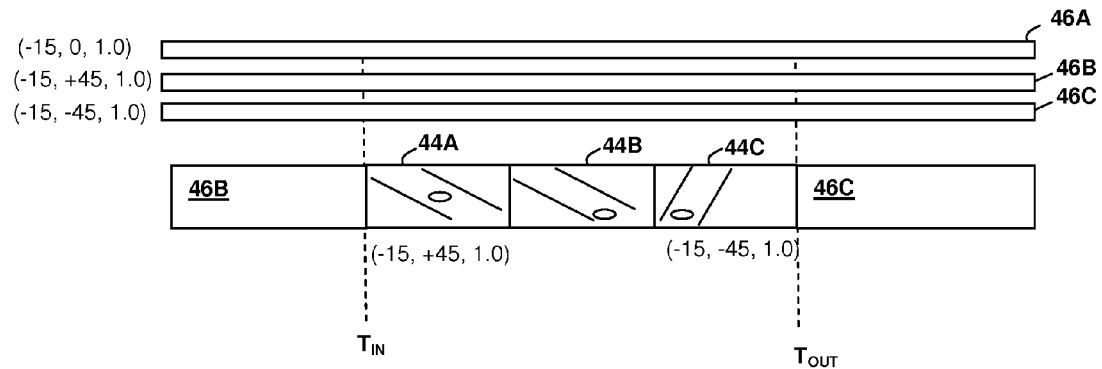

Referring now to FIG. 5B, a time line diagram showing multiple video sources 46A-46C, which for simplicity are illustrated as static camera angles. If camera angles are changed among multiple video sources, then segments such as those illustrated in FIG. 5A would also be employed in order to quantize the camera positions, which may be performed at the frame level or in larger segments. Below the video source timelines, an output timeline is shown, in which a user/viewer views video source 46B, and then switches to a virtual scene having segments 44A-44C. At exit time $T_{OUT}$, video source 46C is selected for return to video, as the camera angle and zoom of video source 46C most closely matches the virtual scene endpoint segment perspective. As mentioned above, the selection may be automatic, or performed under user/viewer control with a list of located matches presented to the user as illustrated in FIG. 4. Further, rather than selecting a single video source from among multiple video source, the video upon return from the virtual scene may be interpolated from two or more multiple video sources having perspectives most closely matching the perspective of the virtual scene exit point.

Figure 6:
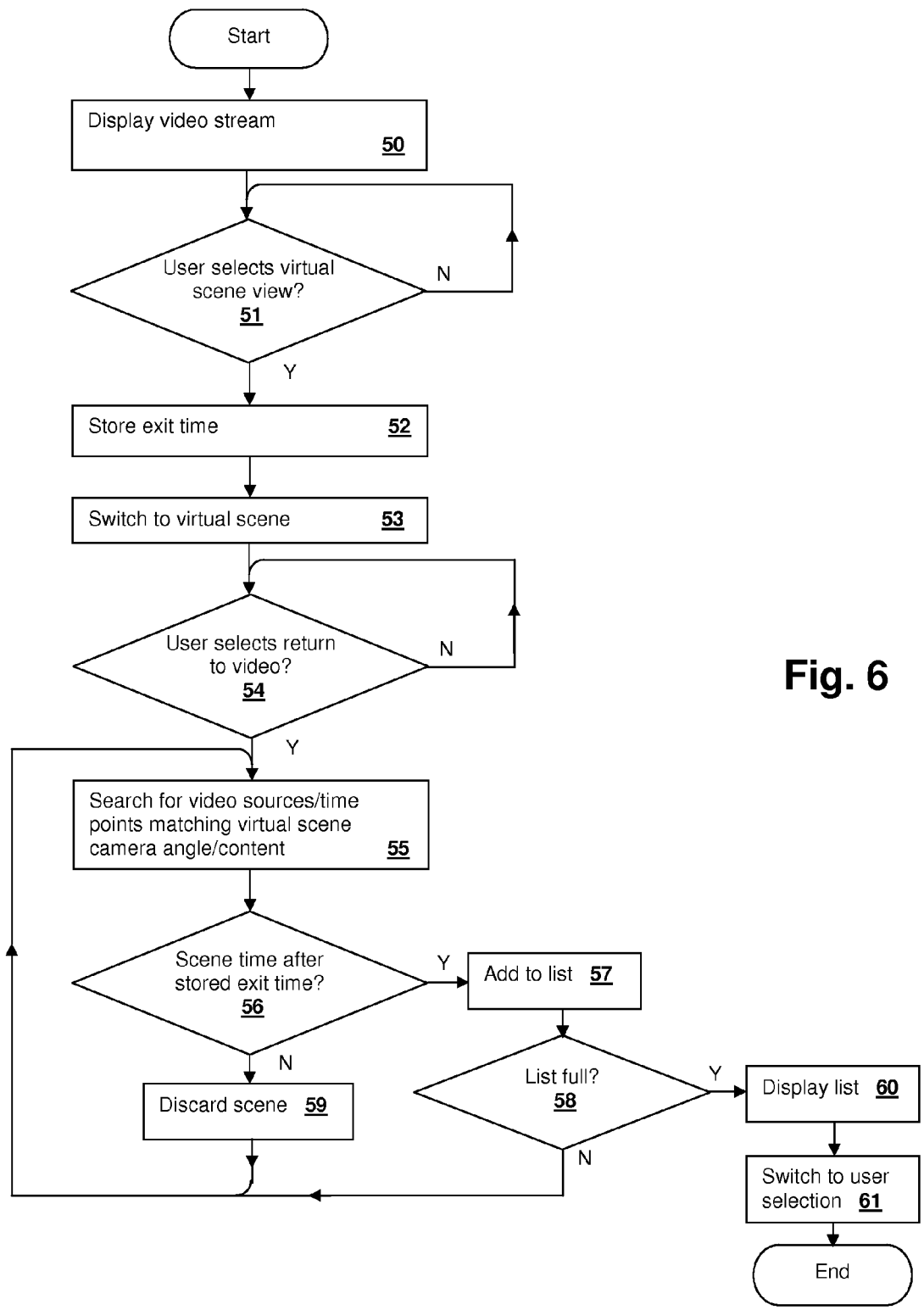
FIG. 6 is a flowchart of a method in accordance with an embodiment of the present invention.

Referring now to FIG. 6, a method according to an embodiment of the present invention is illustrated in a flowchart. First, a video stream is displayed (step 50) and when a user selects a virtual scene view (decision 51), the exit time is stored (step 52) and the view switches to the virtual scene (step 53). When the user selects return to video (decision 54), a search is conducted to locate video source and/or time points that match the virtual scene camera angle/content at the virtual scene endpoint (step 55). If a located matching scene time is after the stored exit time (decision 56), then the scene is added to a list (step 57), otherwise the scene (time point/video source) is discarded (step 59). When the list is full, or another search termination criteria is met (decision 58), the list is displayed (step 60), and in response to user selection, a switch is made to a selected video source/time point (step 61).

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method for controlling a transition from a virtual scene to at least one video stream on a digital video playback device, the method comprising:
   a processor directing playback of the at least one video stream;
   the processor transitioning to displaying the virtual scene, wherein the transitioning comprises storing a time of the transitioning to displaying the virtual scene and halting playback of the at least one video stream;
   the processor receiving an event indicating a request for the transition from the virtual scene to the at least one video stream;
   the processor retrieving the stored time of the transitioning;
   the processor locating at least one time point within the at least one video stream, wherein video content at the at least one time point and a camera angle of the video content at the at least one time point substantially match image content at an endpoint of the virtual scene and a virtual camera angle of the image content at the endpoint of the virtual scene, and wherein the at least one time point within the at least one video stream occurs later in time than the stored time of the transitioning;
   the processor selecting one of the at least one time point; and
   the processor directing playback of a particular one of the at least one video stream containing the selected one of the at least one time point commencing at the selected one of the at least one time point.

2. The method of claim 1, wherein the at least one video stream comprises multiple video streams, and wherein the method further comprises after the processor locating the at least one time point within the at least one video stream, the processor selecting the particular one the at least one video stream according to a camera angle of the video content of the particular one of the at least one video stream having a closest match to the virtual camera angle of the image content at the endpoint of the virtual scene.

3. The method of claim 1, wherein the at least one video stream consists of that particular one of the at least one video stream, and wherein the processor selecting comprises determining that the selected one of the at least one time point has a closest match to the image content at the endpoint of the virtual scene.

4. The method of claim 1, wherein the processor receiving comprises receiving the event as a user input indicating the request to transition from the virtual scene to the at least one video stream, wherein the processor locating comprises locating multiple combinations of the at least one time point and the at least one video stream, and wherein the method further comprises the processor causing display of a list of at least some of the multiple combinations to a user to select the particular one of the at least one video stream and the selected one of the at least one time point.

5. The method of claim 1, wherein the processor locating is performed by the processor within the digital video playback device, wherein the digital video playback device receives camera angle information from a remote service provider, and wherein the processor locating comprises determining the at least one time point of the particular one of the at least one video stream from the received camera angle information.

6. The method of claim 1, further comprising the processor extracting still image information from the at least one video stream, wherein the processor locating comprises determining the at least one time point of the particular one of the at least one video stream by matching the still image information with the image content at the endpoint of the virtual scene.

7. The method of claim 1, further comprising the processor generating the virtual scene within the digital video playback device.

8. A digital video playback device for controlling a transition from a virtual scene to at least one video stream, the digital video playback device comprising:
a processor;
a computer readable storage device coupled to the processor;
program instructions, stored in the computer readable storage device for execution by the processor, to direct playback of the at least one video stream;
program instructions, stored in the computer readable storage device for execution by the processor, to transition to displaying the virtual scene, wherein the program instructions to transition store a time of transitioning to displaying the virtual scene and halt playback of the at least one video stream;
program instructions, stored in the computer readable storage device for execution by the processor, to receive an event indicating a request for the transition from the virtual scene to the at least one video stream;
program instructions, stored in the computer readable storage device for execution by the processor, to retrieve the stored time of the transitioning;
program instructions, stored in the computer readable storage device for execution by the processor, to locate at least one time point within the at least one video stream, wherein video content at the at least one time point and a camera angle of the video content at the at least one time point substantially match image content at an endpoint of the virtual scene and a virtual camera angle of the image content at the endpoint of the virtual scene, and wherein the at least one time point within the at least one video stream occurs later in time than the stored time of the transitioning;
program instructions, stored in the computer readable storage device for execution by the processor, to select one of the at least one time point; and
program instructions, stored in the computer readable storage device for execution by the processor, to direct playback of a particular one of the at least one video stream containing the selected one of the at least one time point commencing at the selected one of the at least one time point.

9. The digital video playback device of claim 8, wherein the at least one video stream comprises multiple video streams, and wherein the program instructions to select the particular one of the at least one video stream according to a camera angle of the particular one of the at least one video stream having a closest match to the virtual camera angle of the image content at the endpoint of the virtual scene.

10. The digital video playback device of claim 8, wherein the at least one video stream consists of the particular one of the at least one video stream, and wherein the program instructions to select determine that the selected one of the at least one time point has a closest content match to the image content at the endpoint of the virtual scene.

11. The digital video playback device of claim 8, wherein the program instructions to receive the event as a user input indicating the request to transition from the virtual scene to the at least one video stream, wherein the program instructions to locate multiple combinations of the at least one time point and the at least one video stream, and further comprising program instructions, stored in the computer readable storage device for execution by the processor, to cause display of a list of at least some of the multiple combinations to a user to select the particular one of the at least one video stream and the selected one of the at least one time point.

12. The digital video playback device of claim 8, wherein the program instructions to locate determine the at least one time point of the particular one of the at least one video stream from camera angle information received from a remote service provider.

13. The digital video playback device of claim 8, further comprising program instructions, stored in the computer readable storage device for execution by the processor, to extract still image information from the at least one video stream, wherein the program instructions to locate determine the at least one time point of the particular one of the at least one video stream by matching the still image information with the image content at the endpoint of the virtual scene.

14. The digital video playback device of claim 8, further comprising program instructions, stored in the computer readable storage device for execution by the processor, to generate the virtual scene.

15. A computer program product for controlling a transition from a virtual scene to at least one video stream on a digital video playback device, the computer program product comprising:
a computer-readable tangible storage device;
program instructions, stored on the storage device, to direct playback of the at least one video stream;
program instructions, stored on the storage device, to transition to displaying the virtual scene, wherein the program instructions to transition store a time of transitioning to displaying the virtual scene and halt playback of the at least one video stream;
program instructions, stored on the storage device, to receive an event indicating a request for the transition from the virtual scene to the at least one video stream;
program instructions, stored on the storage device, to retrieve the stored time of the transitioning;
program instructions, stored on the storage device, to locate at least one time point within the at least one video stream, wherein video content at the at least one time point and a camera angle of the video content at the at least one time point substantially match image content at an endpoint of the virtual scene and a virtual camera angle of the image content at the endpoint of the virtual scene, and wherein the at least one time point within the at least one video stream occurs later in time than the stored time of the transitioning;

program instructions, stored on the storage device, to select one of the at least one time point; and program instructions, stored on the storage device, to direct playback of a particular one of the at least one video stream containing the selected one of the at least one time point commencing at the selected one of the at least one time point.

16. The computer program product of claim 15, wherein the at least one video stream comprises multiple video streams, and wherein the program instructions to select select the particular one of the at least one video stream according to a camera angle of the particular one of the at least one video stream having a closest match to the virtual camera angle of the image content at the endpoint of the virtual scene.

17. The computer program product of claim 15, wherein the at least one video stream consists of the particular one of the at least one video stream, and wherein the program instructions to select determine that the selected one of the at least one time point has a closest content match to the image content at the endpoint of the virtual scene.

18. The computer program product of claim 15, wherein the program instructions to receive the event as a user input indicating the request to transition from the virtual scene to the at least one video stream, wherein the program instructions to locate multiple combinations of the at least one time point and the at least one video stream, and further comprising program instructions, stored on the storage device, to cause display of a list of at least some of the multiple combinations to a user to select the particular one of the at least one video stream and the selected one of the at least one time point.

19. The computer program product of claim 15, wherein the program instructions to locate determine the at least one time point of the particular one of the at least one video stream from camera angle information received from a remote service provider.

20. The computer program product of claim 15, further comprising program instructions, stored on the storage device, to extract still image information from the at least one video stream, wherein the program instructions to locate determine the at least one time point of the particular one of the at least one video stream by matching the still image information with the image content at the endpoint of the virtual scene.

* * * * *